INVENTOR.
Charles W. Macune
BY
Wm. T. Wofford
Attorney

United States Patent Office 2,985,728
Patented May 23, 1961

2,985,728

RECORDER APPARATUS

Charles W. Macune, Fort Worth, Tex., assignor to Westronics, Inc., Fort Worth, Tex.

Continuation of application Ser. No. 683,086, Sept. 10, 1957. This application Aug. 21, 1959, Ser. No. 836,570

7 Claims. (Cl. 200—38)

My invention relates to recorder apparatus, and more particularly to self-balancing potentiometer type recorders incorporating arrangements for actuating a switch to exercise an auxiliary control function when the magnitude of the quantity being recorded reaches a pre-set value. This application is a continuation of my application S.N. 683,086, filed September 10, 1957 now abandoned.

It is a general object of my invention to provide an improved arrangement for accomplishing the auxiliary control function above-mentioned.

Another object of my invention is to provide an improved arrangement for accomplishing the auxiliary control function wherein the means for setting the auxiliary control function mechanism is convenient and accessible.

Another object of my invention is to provide an improved arrangement for accomplishing the auxiliary control function wherein there is a readily visible indication of the auxiliary control function setting.

Another object of my invention is to provide an improved arrangement for accomplishing the auxiliary control function wherein a readily visible indication of the control function setting is conveniently correlated with the recorder chart.

These and other objects are effected by my invention as will be apparent from the following description taken in accordance with the accompanying drawings, forming a part of this application, in which.

Figure 1:
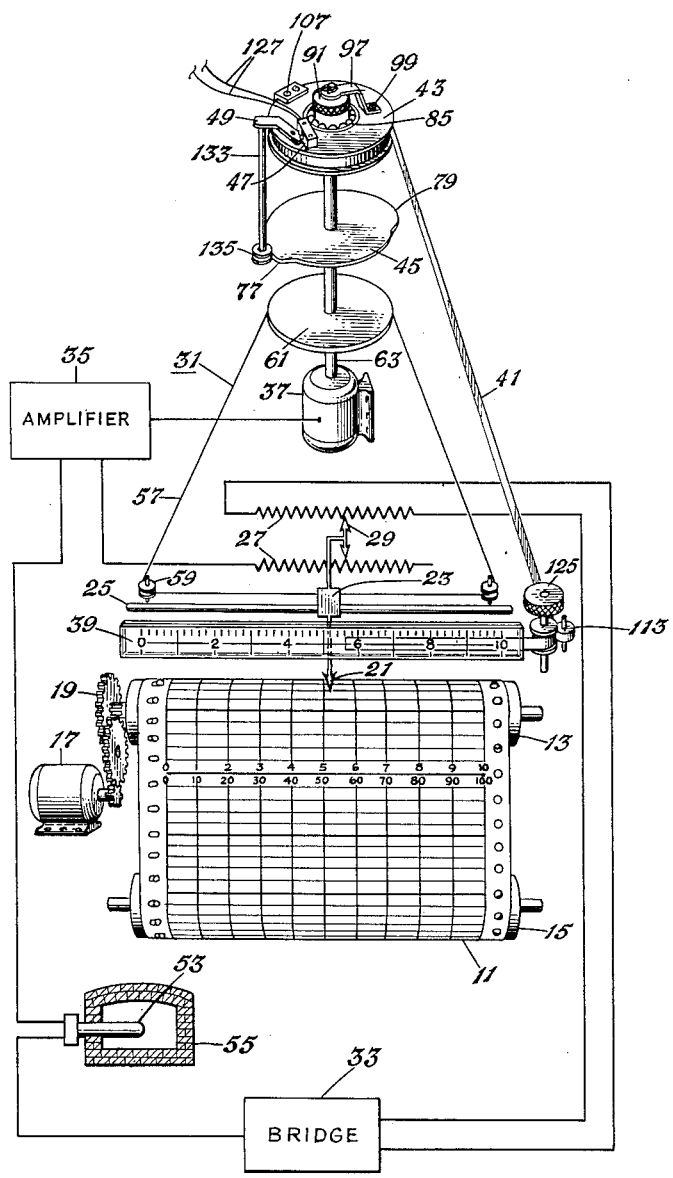
Fig. 1 is a schematic perspective view showing a self-balancing potentiometer type recorder system utilizing the principles of my invention.
Figure 2:
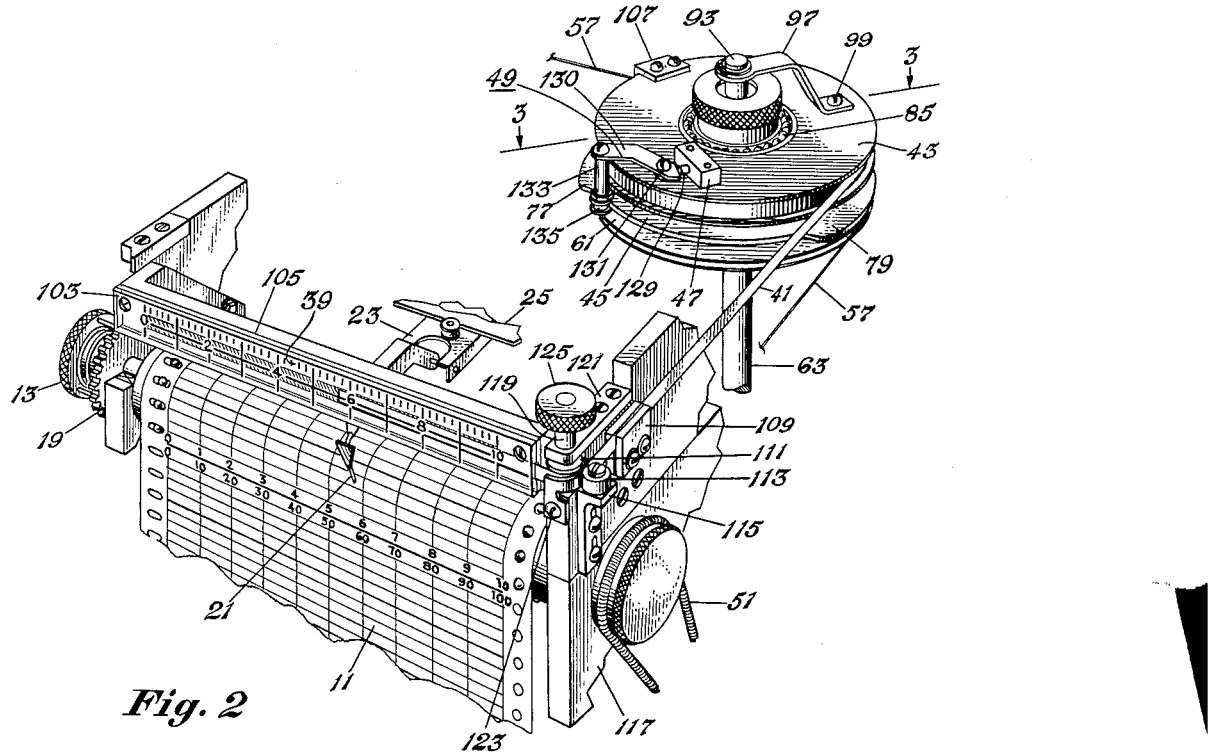
Fig. 2 is a schematic perspective view illustrating a preferred embodiment of my invention.
Figure 3:
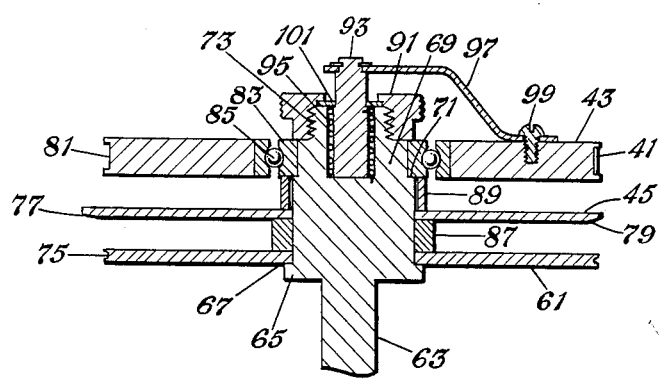
Fig. 3 is a section view taken on lines 3—3 of Fig. 2.

In Fig. 1 there is shown a typical self-balancing potentiometer type recorder system including a recorder chart 11, chart handling rolls 13, 15, chart drive motor 17, chart drive gear reduction 19, chart inking pen 21, inking pen carriage 23, carriage guide 25, potentiometer 27, potentiometer slider 29, pen and slider drive assembly 31, bridge 33, amplifier 35, and balancing motor 37. The arrangement of my invention is sometimes herein referred to as the "front-set" arrangement. Figs. 2 and 3 show the essential elements of a "front-set" arrangement in accordance with a preferred embodiment of the invention, including an indicator scale 39, indicator tape 41, tape drum 43, cam disk 45, micro-switch 47, and switch actuator assembly 49.

The recorder mechanism per se, shown in schematic form in the drawings, is of a type generally known as the self-balancing potentiometer type. The recorder chart 11 is reeled off a supply drum (not shown) over the drive drum 13 and down onto the storage drum 15. The chart 11 is caused to move at a pre-selected rate and is driven by a constant speed electric motor 17 through the gear train 19. The storage drum 15 is rotated at the proper rate by means of a spring belt 51 which is powered from the drive drum 13. The balancing motor 37 is of a type such that its motion and direction of rotation is controlled by the character of electric signals applied to its windings. In operation, a sensing element, illustrated in Fig. 1 as a thermo-couple 53 in a furnace 55, converts the condition of the quantity to be recorded into corresponding electric signals which are applied in the circuits of the amplifier 35 and bridge 33. The bridge 33 acts to compare the magnitude of the sensing element signal with a reference voltage which has a magnitude corresponding to the position of the potentiometer slider 29 at any given time. The signal resulting from the comparison, termed the error signal, is then fed to the amplifier input. The amplifier 35 acts to amplify the input error signals and convert them to a form suitable for use as balancing motor control signals. The amplifier output is fed to the balancing motor 37. A length of recorder pen drive thread 57 is fixed to the carriage 23 and extends to one end of the carriage guide 25, then over a spool 59 and to and around a thread drive drum 61, then to and over a spool 62 at the opposite end of the carriage guide 25, and then back to the carriage 23. The thread drive drum 61 is fixed to the output shaft 63 of the balancing motor 37. Thus, rotation of the balancing motor 37 controls movement of the carriage 23, and consequently the position of the recorder pen 21, and the potentiometer slider 29. The recorder operates to maintain its recorder pen 21 at a proper position corresponding to the condition of the quantity to be recorded. For example, assume that the quantity being recorded is furnace temperature, and that the temperature is standing at a certain initial magnitude. Under those conditions, the recorder pen 21 will be at rest at the proper position corresponding to the said initial temperature. Assume then that the temperature changes to a second magnitude. The temperature change varies the sensing device output which causes bridge unbalance, with a resultant error signal, which causes the balancing motor 37 to rotate in the proper direction to move the recorder pen 21 in the direction of the temperature change, and at the same time the potentiometer slider 29 is moved in the proper direction to vary the magnitude of the reference voltage in a proper sense tending to restore balance of the bridge 33. When the recorder pen 21 has been moved to a position corresponding to the second temperature magnitude, the potentiometer slider 29 is in a position such that the reference voltage is of the proper magnitude to balance the bridge 33, and the error signal magnitude is such as to cause the balancing motor 37 to be at rest.

As hereinbefore stated, it is frequently desirable to incorporate in a recorder an arrangement for actuating a switch to exercise an auxiliary control function when the magnitude of the quantity being recorded reaches a predetermined value. For example, if furnace temperature is being recorded, it may be desirable to sound an alarm when the temperature exceeds a certain magnitude or falls below a certain magnitude. As shown by Figs. 2 and 3, the balancing motor output shaft 63 has an enlarged end portion including a first cylindrical section 65 carrying a key slot 67, and a second cylindrical section 69 of slightly reduced diameter forming a shoulder 71 at its junction with the first, and having threads 73 at its end portion. The thread drive drum 61 is a disk having a suitable peripheral groove 75 for carrying the carriage drive thread 57, and having a central bore adapted to be received on the first cylindrical section 65 of the balancing motor output shaft 63, and with a projection to be received by the key slot 67. The cam disk 45 has a first radius over 180 degrees of its periphery and a second slightly larger radius over 180 degrees of its periphery, with cam contour at the radius transition, or control point portions at 77 and 79. The tape drum 43 is provided with a suitable peripheral groove 81 for receiving the tape 41. The tape drum is journaled on a hub 83 by means of bearings 85. In assembly, the thread drive drum 61 is placed on the first enlarged section 65, of the shaft 63, then a first spacer 87, then the cam disk 45, and then a second spacer 89. Then the hub 83 of the tape drum 43 is placed on the second enlarged section 69 of the shaft 63, resting on the shoulder 71, then a cap nut 91 is threaded onto the threaded end of the second shaft section 69. The cap nut 91 has a central bore in the cap end for a purpose to be hereinafter explained. The outer end of the balancing motor shaft 63 has a central bore adapted for receiving a torque pin 93. The torque pin has a sufficiently loose fit in the bore to be surrounded by a coil spring 95. A torque arm 97 is fixed at one end to the torque pin 93 and at the other end by means of a screw 99 to the tape drum 43. The torque pin 93 is held in place in the bore by a washer 101 which sits on a shoulder of the pin 93 and is in turn secured by the cap nut 91. The coil spring 95 is fixed at its lower end to the shaft bore and at its upper end to the torque arm 97.

The scale 39 is made up of two pieces of material sandwiched together. The outer piece 103 is translucent and carries the scale markings while the inner piece 105 serves as a backing member. The translucent piece 103 carries a groove which forms a slot with the backing piece 105. A free end of the tape 41 is received by the slot. The scale 39 is mounted to a support member by means of screws. The scale 39 extends parallel to the chart drive drum axis and is located immediately above the chart drive drum 13. The scale markings are such as to correspond with chart markings and are aligned with same. The tape 41 is a flexible metal strip, one end portion of which is slidably fixed to the tape drum groove 81 by means of a friction block 107. The position of the tape end with respect to the friction block 107 may be adjusted by loosening the block, sliding the tape to the desired location, and then tightening the block. The tape 41 extends clockwise from the block 107 part way around the drum 43 and forward toward the right end of the scale, where it is passed through a guide block 109 and then between first and second tape friction drive rollers, 111, 113, and part way around the first said roller and into the scale slot. The second said roller 113 is journaled on a bracket 115 for free rotation about a vertical axis. The bracket 115 is fixed to the chart drum mount frame 117. The first said roller 111 is fixed to a vertical shaft 119 which is journaled in brackets 121, 123, fixed to the chart drum mount frame 117. A control knob 125 is fixed to the upper end of the first roller shaft 119. Rotation of the control knob 125 drives the tape 41 and thus positions the end of the tape in the scale slot and also causes the tape drum 43 to rotate. The bias of the coil spring 95 is controlled by rotating the torque arm 97 a few turns and then fixing its outer end to the tape drum by means of a screw 99. The bias of the coil spring is adjusted so that the torque exerted by the torque arm and tending to wind the tape onto the tape drum is just a little less than that required to overcome the friction of the guide block 109, drive rollers 111, 113 and tape slot. Thus, the tape and tape drum remain fixed in any position selected by control knob rotation and yet will move easily in either direction when the control knob 125 is rotated. The micro-switch 47, which may be of a convenient type having output leads 127 and an actuator button 129, is fixed to the top side of the tape drum 43. The switch actuator assembly comprises an actuator arm 130 pivoted near one end at 131 to the tape drum adjacent the switch actuator button 129 and extending beyond the periphery of the tape drum, and a pin 133 depending from the outer end of the arm and having a small grooved roller 135 journaled at its end portion. The grooved roller is centered in the central plane of the cam disk 45 and rides on the disk edge. The inner end of the arm 130 is in contact with the actuator button 129. So long as the cam disk 45 is positioned such that the grooved roller 135 is riding on the cam disk minimum radius sector, the switch 47 is in the non-actuated condition. When the cam disk 45 is rotated through a control point, the grooved roller 135 rides up the cam surface 77 or 79 onto the maximum radius sector, causing the end of the arm 130 in contact with the actuator button 129 to move inward, actuating the switch mechanism.

In operation of the "front-set" arrangement of the invention, assume that it is desired to energize an external circuit to sound an alarm when temperature being recorded exceeds a certain magnitude corresponding to 8 on the scale 39. The control knob 125 is simply rotated until the end of the tape 41 is at 8 of the scale. This causes the tape drum 43 to rotate, moving the switch 47 and switch actuator assembly 49 to a predetermined position with respect to the cam disk 45, such that when the temperature reaches the position of 8 on the chart scale, the balancing motor 37 will have also rotated the cam disk to a position where the grooved roller 135 of the switch actuator assembly rides up on the cam disk control point cam contour 77 or 79, pressing the switch actuator button 129 to close the external circuit and cause the alarm to sound. If it is desired to sound the alarm when the temperature reaches a predetermined minimum value, the control knob 125 is simply rotated so that the tape end is at the scale mark corresponding to the desired value. This causes the switch actuator assembly 49 to be moved to a position such that the grooved roller 135 will ride up on the other cam disk control point cam contour 77 or 79, to actuate the switch and sound the alarm when the balancing motor moves the cam disk to the critical position. The "front-set" arrangement is calibrated by adjusting the position at which the tape 41 is clamped by the friction block 107 to the tape drum 43.

It is apparent from the foregoing that I have provided a "front-set" arrangement which is quite convenient and accessible, simple and effective, and wherein the setting is readily visible and is correlated with the recorder chart markings.

While I have shown my invention in only one form, it will be obvious to those skilled in the art that it is not so limited, but is susceptible of various changes and modifications without departing from the spirit thereof.

I claim:

1. In a recorder of the self-balancing potentiometer type having a balancing motor driving a recorder pen to ink a moving chart, a "front-set" arrangement comprising a cam disk driven by said balancing motor, a tape drum mounted for rotation independently of said cam disk, a switch and switch actuator assembly mounted on said tape drum, said actuator assembly including an element riding on said cam disk, a scale, a length of flexible tape, tape drive mechanism mounted adjacent one end of said scale, means for slidably receiving one end portion of said tape alongside said scale, manual control means for moving said tape drive mechanism, means for fixing said tape at one end to said tape drum, the other end portion of said tape being fed through said tape drive mechanism and received in said receiving means, and means for biasing said tape drum to tend to wind said tape onto said drum, the torque exerted by said drum being less than that required to move said tape.

2. In a recorder of the self-balancing potentiometer type having a balancing motor driving a recorder pen to ink a moving chart, a "front-set" arrangement comprising a cam disk driven by said balancing motor, a tape drum mounted for rotation independently of said cam disk, a switch and switch actuator assembly mounted on said tape drum, said actuator assembly including an element riding on said cam disk, a scale mounted parallel to the transverse dimension of said chart and adjacent thereto, a length of flexible tape, tape drive mechanism mounted adjacent one end of said scale, means for slidably receiving one end portion of said tape alongside said scale, manual control means for moving said tape drive mechanism, means for fixing said tape at one end to said tape drum, the other end portion of said tape being fed through said tape drive mechanism and received in said receiving means, and means for biasing said tape drum to tend to wind said tape onto said drum, the torque exerted by said drum being less than that required to move said tape.

3. In a recorder of the self-balancing potentiometer type having a balancing motor driving a recorder pen to ink a moving chart, a "front-set" arrangement comprising a cam disk driven by said balancing motor, a tape drum mounted on a common shaft with said cam disk for rotation independently of said cam disk, a switch and switch actuator assembly mounted on said tape drum, said actuator assembly including an element riding on said cam disk, a translucent scale mounted parallel to the transverse dimension of said chart immediately above same, a length of flexible tape, tape drive mechanism mounted adjacent one end of said scale, a slot behind said scale and extending longitudinally thereof for receiving one end portion of said tape, manual control means for moving said tape drive mechanism, means for fixing said tape at one end to said tape drum, the other end portion of said tape being fed through said tape drive mechanism and received in said slot, and means for biasing said tape drum to tend to wind said tape onto said drum, the torque exerted by said drum being less than that required to move said tape.

4. In a recorder of the self-balancing potentiometer type having a balancing motor driving a recorder pen to ink a moving chart, a "front-set" arrangement comprising a cam disk driven by said balancing motor, a tape drum mounted on a common shaft with said cam disk for rotation independently of said cam disk, a switch and switch actuator assembly mounted on said tape drum, said actuator assembly including an element riding on said cam disk, a translucent scale mounted parallel to the transverse dimension of said chart immediately above same, a length of flexible tape, tape friction roller drive mechanism mounted adjacent one end of said scale, a slot behind said scale and extending longitudinally thereof for receiving one end portion of said tape, a control knob for moving said tape drive mechanism, means for adjustably fixing said tape at one end to said tape drum, the other end portion of said tape being fed through said drive mechanism friction rollers and received in said slot, and means for biasing said tape drum to tend to wind said tape onto said drum, the torque exerted by said drum being less than that required to move said tape.

5. In a recorder of the self-balancing potentiometer type having a balancing motor driving a recorder pen to ink a moving chart, a cam disk positioned by said balancing motor, a switch actuator adapted for co-operation with said cam disk, a length of flexible tape, means attached to one end of said tape for positioning said switch actuator, with the other end of said tape being free a scale, independent of said chart means for utilizing the free end of said tape as an indicator associated with said scale, and means for manually positioning said tape.

6. In a recorder of the self-balancing potentiometer type having a balancing motor driving a recorder pen to ink a moving chart, a cam disk positioned by said balancing motor, a switch actuator adapted for co-operation with said cam disk, a tape drum carrying said switch actuator and mounted for independent rotation about an axis common to said drum and said cam disk, a length of flexible tape, means for attaching one end of said tape to said drum for positioning said switch actuator, a scale, means for utilizing the other end of said tape as an indicator associated with said scale, and means for manually positioning said tape.

7. In a recorder of the self-balancing potentiometer type having a balancing motor driving a recorder pen to ink a moving chart; means for controlling an external circuit, said means comprising a first element positioned by said balancing motor, and a second element adapted for co-operation with said first element; a length of flexible tape, means attached to one end of said tape for positioning said second element; with the other end of said tape being free; a scale, independent of said chart means for utilizing the free end of said tape as an indicator associated with said scale, and means for manually positioning said tape.

References Cited in the file of this patent

UNITED STATES PATENTS

| | | |
|---|---|---|
| 1,713,771 | Melching | May 21, 1929 |
| 1,744,548 | Hershey | Jan. 21, 1930 |
| 1,930,353 | Doyle | Oct. 10, 1933 |
| 1,930,496 | Wilson et al. | Oct. 17, 1933 |
| 2,113,817 | Sneddow | Apr. 12, 1938 |
| 2,178,066 | Clark | Oct. 31, 1939 |
| 2,224,193 | Mahnken | Dec. 10, 1940 |
| 2,321,780 | Tondeur | June 15, 1943 |